United States Patent [19]

Barrett

[11] Patent Number: 5,188,228
[45] Date of Patent: Feb. 23, 1993

[54] COMPACT DISK HOLDER

[76] Inventor: Michael P. Barrett, 504 Carl Ct., Prospect Heights, Ill. 60070

[21] Appl. No.: 799,715

[22] Filed: Nov. 26, 1991

Related U.S. Application Data

[63] Continuation-in-part of Ser. No. 561,330, Jul. 31, 1990, abandoned.

[51] Int. Cl.⁵ .............................................. B65D 85/30
[52] U.S. Cl. .................................... 206/310; 206/313; 220/337; 312/9.64
[58] Field of Search ............... 206/313, 312, 311, 310, 206/309, 444, 45.15, 387; 220/337, 338; 312/9, 10, 11; 16/366, 370, 378, 379

[56] References Cited

U.S. PATENT DOCUMENTS

| | | | |
|---|---|---|---|
| 1,287,842 | 12/1918 | Betts | 206/311 |
| 4,006,821 | 2/1977 | Sautter | 206/45.15 X |
| 4,327,831 | 5/1982 | Inaba et al. | 206/444 X |
| 4,535,888 | 8/1985 | Nusselder | 206/444 |
| 4,538,730 | 9/1985 | Wu | 206/444 |
| 4,702,369 | 10/1987 | Philosophe | 206/312 |
| 4,776,482 | 10/1988 | Wolters et al. | 206/444 X |
| 4,778,047 | 10/1988 | Lay | 206/311 X |
| 4,793,480 | 12/1988 | Gelardi et al. | 206/444 X |
| 4,807,749 | 2/1989 | Ackeret | 206/307 X |
| 4,823,950 | 4/1989 | Roze | 206/444 X |
| 4,844,260 | 7/1989 | Jaw | 206/311 X |
| 4,863,025 | 9/1989 | Wolf | 206/387 |
| 4,867,302 | 9/1989 | Takahashi | 206/312 X |

OTHER PUBLICATIONS

CD Review–May, 1989.
Stereo Review–Nov., 1990.
Accessible Accessories–undated.

Primary Examiner—Paul T. Sewell
Assistant Examiner—Jacob K. Ackun, Jr.
Attorney, Agent, or Firm—McAndrews, Held & Malloy, Ltd.

[57] ABSTRACT

A disk storage device includes a lid, a disk holder page, and a base. The lid and page are pivotally attached to the base. The device further includes a closing means so that one may directly open the device to any page or the base without turning the individual pages.

11 Claims, 6 Drawing Sheets

COMPACT DISK HOLDER

The present application is a continuation-in-part of application Ser. No. 561,330, filed Jul. 31, 1990, now abandoned.

BACKGROUND OF THE INVENTION

The present invention relates to a storage device for disks. More particularly it relates to a book-like device for storing compact disks ("CDs") or the like with their corresponding identification labels in a compact and efficient manner for easy carrying and storage.

With the advent of the computer age, data disks such as music CDs, audio disks, video disks, etc., have become a necessity in both business and personal applications. Such disks are generally commercially marketed individually. If desired, data disks may be purchased in a multiple disk package; however, each disk is still usually packaged individually to maintain the ability to store independently and transport the single disk. These packages are convenient for carrying a single disk but do not provide for convenient and efficient handling of a large number of disks.

An excellent example of these prior art disk cases is a CD case, often called a "jewel" case. Jewel cases are bulky and cumbersome, especially when transported or carried in groups. The smooth plastic outer surfaces of the jewel cases also create problems when attempting to maintain them in an orderly fashion. Further, because of the separate cases, storage, transportation, selection, and re-storage of a large number of cases can create confusion and disorder.

The disk holders for other types of disks generally have the same drawbacks of CD jewel cases.

Where a device is intended to store multiple disks, the device is generally designed to receive the individual disk holders. This provides an orderly manner of storage but lacks the efficient and convenient characteristic necessary for easy transportation of properly stored and organized disks.

It is therefore an object of the present invention to provide for a disk storage device which accommodates disks in a convenient, efficient manner for storage, order, and transportation.

It is a further object of the invention to provide a storage device for multiple disks wherein the disks can be removed from their original individual storage device and stored with their accompanying identification label in a convenient, efficient, and orderly manner.

Other objects and advantages of the present invention will become apparent in a detailed description of the invention.

SUMMARY OF THE INVENTION

The above noted and other objects are accomplished by the present invention of a storage device for disks wherein many disks may be stored with their accompanying identification labels for easy storage, order and transportation. This device comprises a lid, a disk holder page, and a base. The underside of the lid preferably includes openings to retain an identification label corresponding to the compact disk which is on the top side of the page. The bottom side of the page receives an identification label corresponding to the compact disk on the subsequent page or the base. The lid and the page or pages are pivotally attached to the base thus providing the opening means for the disk storage device.

DETAILED DESCRIPTION OF THE INVENTION

Figure 1:
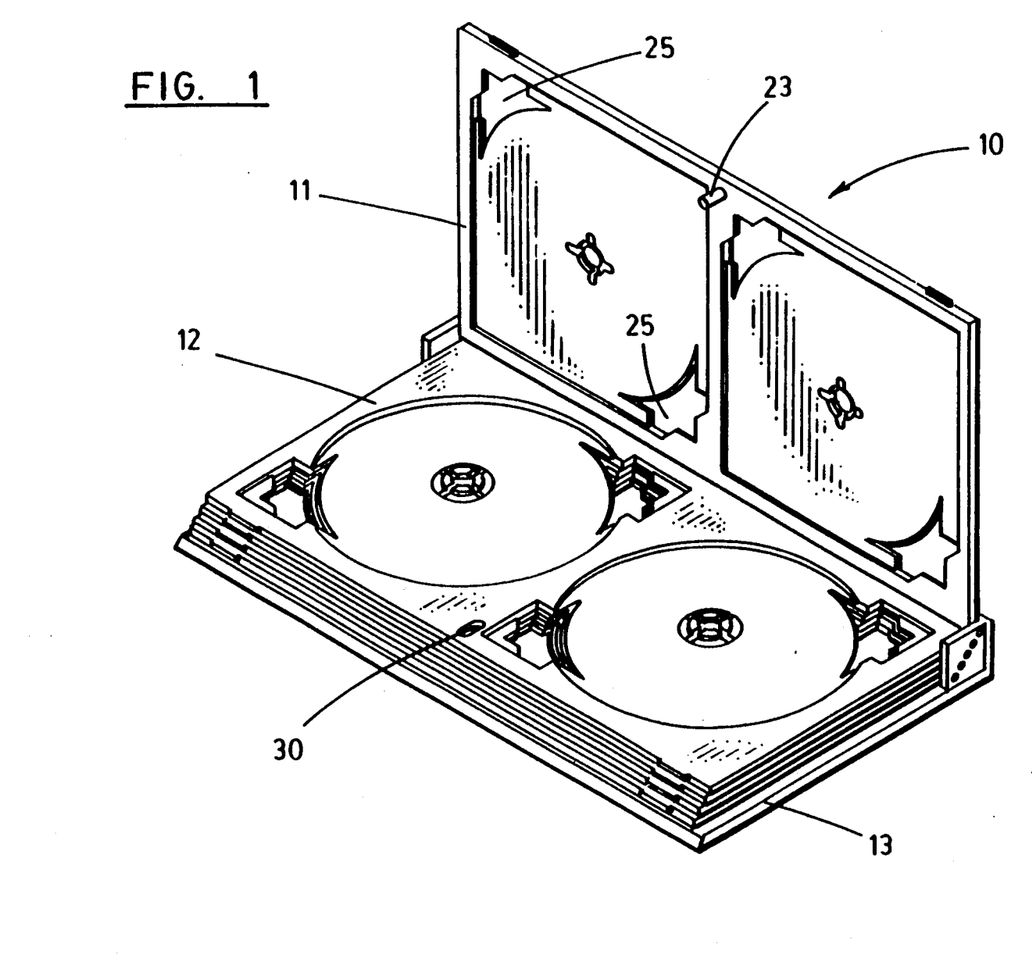
FIG. 1 is a perspective view of the preferred embodiment of this invention adapted to accommodate two music CDs per page and showing the lid in an opened position.

FIG. 1 is a perspective View of an embodiment of the invention. A disk storage device 10 comprises a lid 11, a base 13, and at least one disk holder page 12. The lid 11 and the pages 12 are pivotally attached to the base 13 so that the lid 11 and then the individual pages 12 may be pivotally swung to an opened position without interfering with each other. Additionally, the pivotally attached lid and pages 12 allow the user to open the device 10 to any page 12 or to the base 13 without separately turning through the device 10 to the desired page 12.

Figure 2:
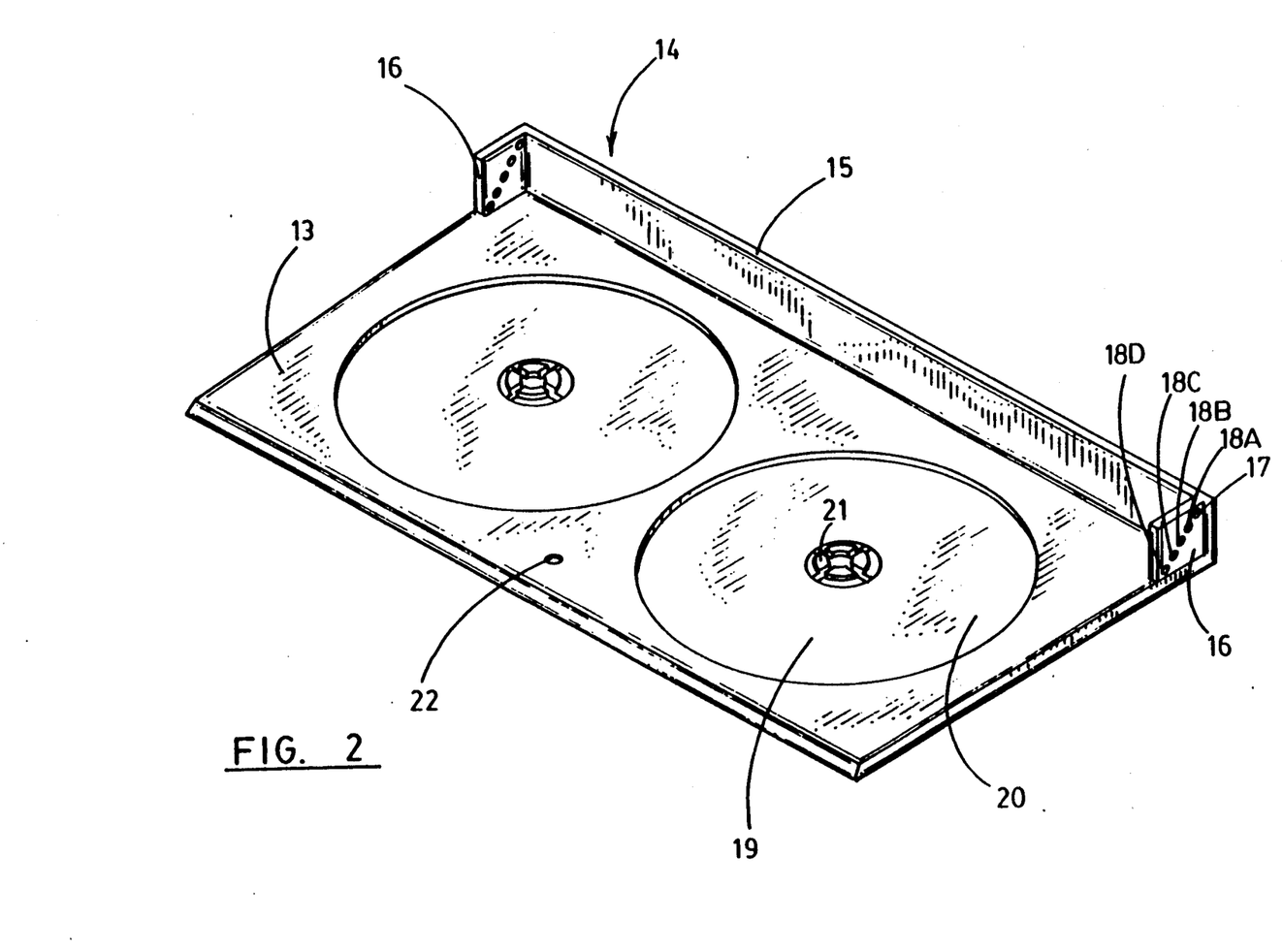
FIG. 2 is a perspective view of a base and its various features including two disk holding pads and a foot.

FIG. 2 is a perspective view of the base 13. The base 13 includes the pivoting feature of the preferred embodiment. The base 13 comprises a foot 14 having two opposed side walls 16 and a back wall 15. The preferred embodiment, as illustrated in the figures, comprises two side walls 16; however, it is the pivoting feature of these walls 16 that provides certain advantages of the invention and any number of walls may be used as long as they include this pivoting feature. The pivoting means of the preferred embodiment includes the diagonally upwardly outward pivot points 17, 18A, 18B, 18C, and 18D—topmost point 17 being the topmost and outermost pivot point. The side walls 16 are illustrated as generally square; however, their shape can be altered to suit one's needs. The pivot points 17, 18A, 18B, 18C, and 18D define a diagonal line (preferably 45°) across the side walls 16. The spacing and diameters of the pivot points 17, 18A, 18B, 18C, and 18D depend upon the thickness of the pages 12 to be used. The page thickness will depend upon the end use, i.e., the type of disk to be stored, and the material used. A strong, flexible polymer, e.g., polystyrene, is preferred, allowing a page thickness from about 1/16 inch to about ⅛ inch.

FIG. 2 also shows disk holding pads 19 of the base 13. As the preferred embodiment may be used to accommodate music compact disks, the holding pads 19 are made so that a compact disk will fit snugly in a recessed portion 20 of the base 13 while being retained by a hub 21. This hub 21 can be as in any conventional compact disk case, e.g., the hub in a jewel case. The base 13 also has an aperture 22. This aperture 22 along with the peg 23 of the lid 11 as shown in FIG. 1, and the slit 30 and peg 36 of FIGS. 4 and 5, respectively (each more fully described below), constitute the closing means of the preferred embodiment.

Figure 3:
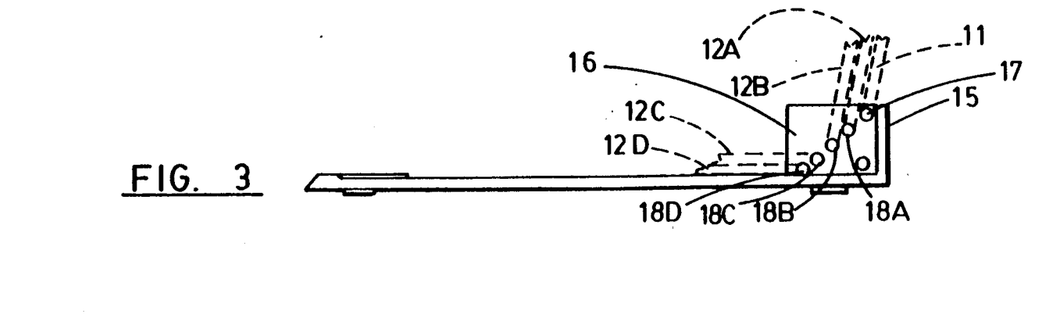
FIG. 3 is a side view of the base with four pages, two of which are in an opened position in conjunction with the lid.

FIG. 3 is a side view of the base 13. The back wall 15 can be used as a brace to support the lid 11 when the lid 11 is in an opened position. As can be seen in FIG. 3, the topmost pivot point 17 is not immediately adjacent to the back wall 15. This allows the lid 11 to be opened to an angle just greater than 90°—the back wall 15 providing the support for the lid 11. However, as will be more fully described below, this bracing feature is not necessary.

FIG. 3 also shows the pivot feature of this invention. The storage device shown in FIG. 3 has a lid 11 and four pages 12A, 12B, 12C, and 12D. The lid 11 is attached to side wall 16 at the topmost pivot point 17. The individual pages 12A, 12B, 12C and 12D are attached to the remaining pivot points 18A, 18B, 18C, and 18D respectively, as shown in FIG. 3.

As noted above, the back wall 15 may be used as a brace for the lid 11 when the lid 11 is in an opened position. Also shown in an opened position are pages 12A and 12B illustrating how the individual pages 12 may be pivotally swung to an opened position without interfering with each other.

FIG. 1 shows the peg 23 and slit 30. When the lid 11 is opened in conjunction with at least one page 12A, the interaction between peg 23 and slit 30 maintains the lid 11 in a relatively vertical position without resort to the bracing feature of back wall 15. The lid 11 and top page 12A will lock up, i.e., maintain contact at all times, to prevent the lid 11 from completely opening. Alternatively, the lid 11 may be left unsupported to swing to a fully opened position, about 180°, or may be braced by some other support. For example, a cabinet may be used as the support when the device 10 is used in a cabinet drawer. When the drawer containing the device 10 is in an opened position, the cabinet will provide the support for the lid 11.

Figures 5, 6:
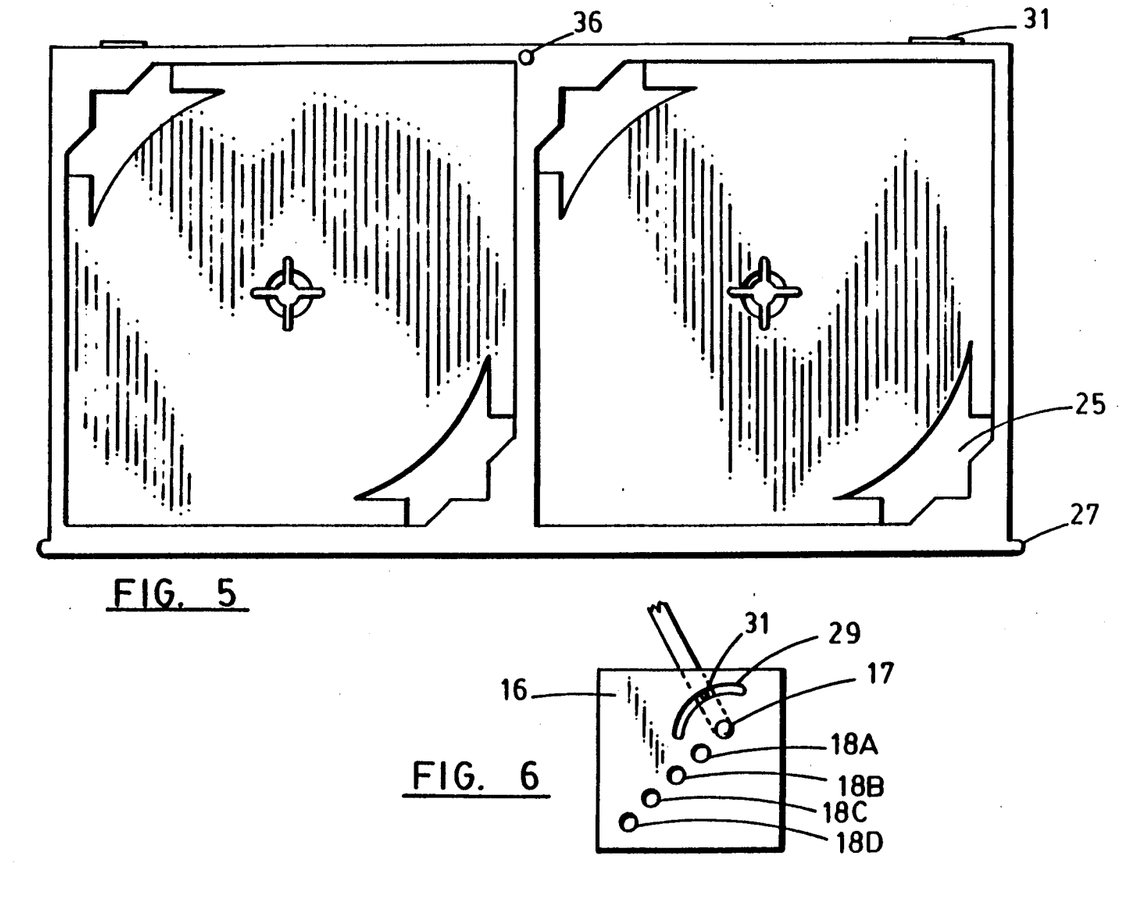
FIG. 5 is a bottom view of a page including the star shaped openings designed to retain an identification label.
FIG. 6 is a side view of the side wall.

FIG. 6 shows an alternate mode of supporting lid 11. Side walls 16 may be provided with a curved retaining slot 29. Slot 29 begins its arc in the horizontal plane defined by the lid 11 when the lid 11 is in a closed position. The retaining slot 29 then circularly curves upward to define an arc of just greater than 90°. The lid 11 must then be provided with a pin 31 to slide within the retaining slot 29. The pin 31 will prevent the lid 11 from swinging to an opened position wider than the retaining slot will allow.

FIGS. 1, 2, 4, and 5 show the various items of the closing means of the preferred embodiment. When the lid 11 is in a closed position, the lid peg 23 slips into slit 30, the peg 23 being positioned in the innermost portion 34 (shown in FIG. 4) of slit 30. In this way, when the device 10 is opened to a page 12 other than the first page 12A both the lid 11 and the first page 12A and succeeding pages may be opened as one. The interaction between peg 23 of the lid 11, peg 36 of the pages 12 and slit 30 of the pages 12 allows the pegs 23, 36 to slide outwardly in the slits 30 so that when the lid and pages are opened, the pegs 23, 36 will slide to the outermost part 35 (shown in FIG. 4) of slits 30. The lid 11 and pages 12 are each provided with a protruding tab 31 for easy access to any page 12 in the device 10. Thus, the device 10 may be opened to the desired page 12 by merely lifting the appropriate tab 31 without separately turning to the desired page 12.

Also, as illustrated in FIG. 1, the lid 11 is adapted to receive identification labels, as, for example, those accompanying commercially sold CDs. The star-shaped openings 25 are positioned so as to receive diagonally opposed corners of the identification labels. However, slots for holding the label edges or any other retaining means may also be used. In this way, the identification label retained by the lid openings 25 will correspond to the disk held in holding pad 19 of the topmost page 12A. The preferred embodiment shown in FIG. 1 allows for two identification labels and two compact disks. The left identification label corresponds to the left compact disk and the right identification label corresponds to the right compact disk.

Figure 4:
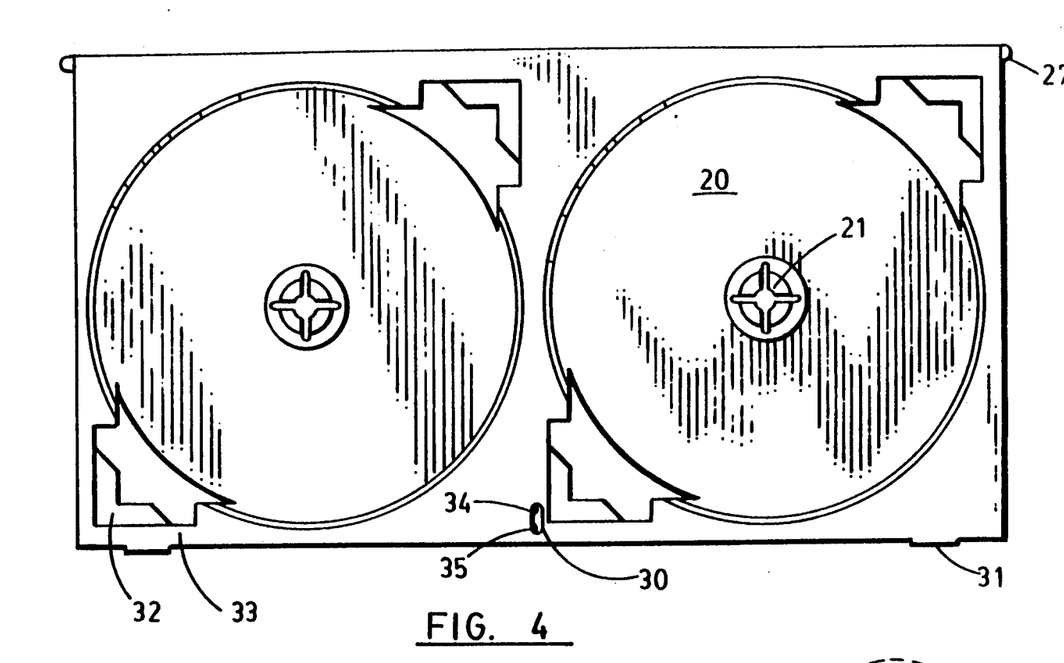
FIG. 4 is a top view of a page including two disk holding pads.

FIG. 4 shows a top view of a page 12. Page 12 is provided with a holding pad 19 and hub 21 to accommodate a music CD. Further, as mentioned above, page 12 contains a slit 30 to receive peg 23 or 36. The page 12 is also provided with pivot knobs 27 designed to operate with the pivot points 18 to provide the pivoting opening feature of the preferred embodiment.

FIG. 5 shows an underside view of page 12. The underside of page 12 is provided with openings 25 to accommodate an identification label. These openings 25 are shaped and located identically as on the lid and similarly designed to retain the identification label corresponding to the compact disk retained by the page 12 immediately below. FIG. 4 illustrates the two-level construction of the star-shaped openings 25 whereby the corners of an identification label may be inserted into the star-shaped openings 25 such that it need not be bent out of shape. Viewing from the page top, as seen in FIG. 4, first level 32 sits below second level 33 a sufficient amount to accommodate the desired identification label. The openings 25 of lid 11 may be provided with the same construction.

Figure 7:
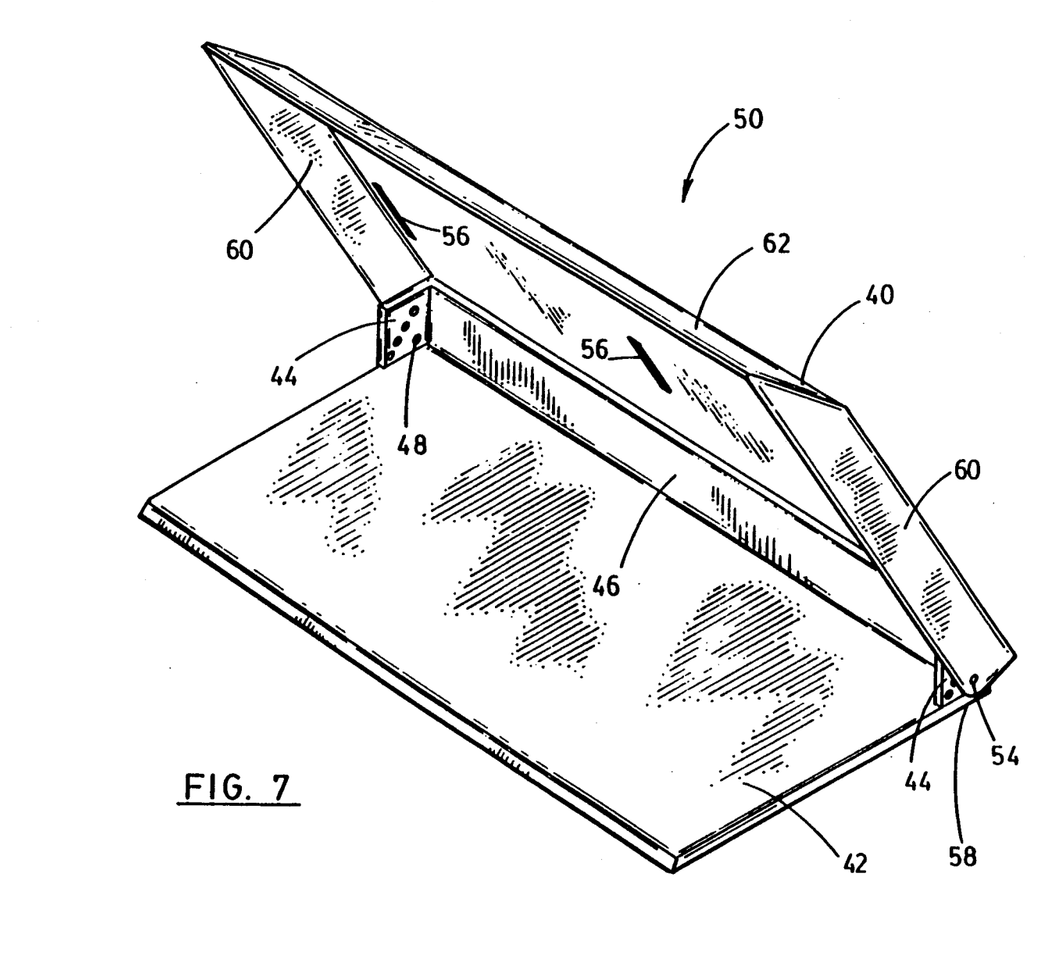
FIG. 7 is a perspective view of a top and a bottom.

FIG. 7 is a perspective view of a top 40 and bottom 42 which can be used in the present invention to protect the discs. Neither the top 40 nor bottom 42 has openings; consequently, when the top 40 is closed the storage device 50 prevents dust and dirt from entering and soiling the CDs.

The bottom 42 is the equivalent of base 13 of FIG. 2 except that the bottom 42 does not have the disc holding pads 19 of base 13. Bottom 42 however does have a back wall 46 and side walls 44. Side walls 44 provide the same features to the bottom 42 as the side walls 16 provide to base 13. Side walls 44 are each additionally equipped with a pivot point 48 adjacent the back wall 46 in the lower corner of side walls 44.

Top 40 has peg 54 which cooperates with pivot point 48 to pivotally attach top 40 to bottom 42. Top 40 also has insert slits 56 to accommodate a CD identification label. Insert slits 56 serve the same purpose as openings 25 of FIG. 5. Insert slits 56, however, provide the further advantage that no apertures are needed in top 40 to retain a CD label; consequently, top 40 has no holes through which dust might enter the device 50.

Top 40 has extending sides 60. The extending sides 60 each have a rounded corner 58. Rounded corner 58 allows top 40 to pivot open even though the extending sides 60 extend sufficiently to entirely enclose bottom 42. Top 40 also has a slanted front 62 which may be designed to follow the outline of pages 12 of FIG. 1 when they are in a closed position.

Figures 8, 9, 10:
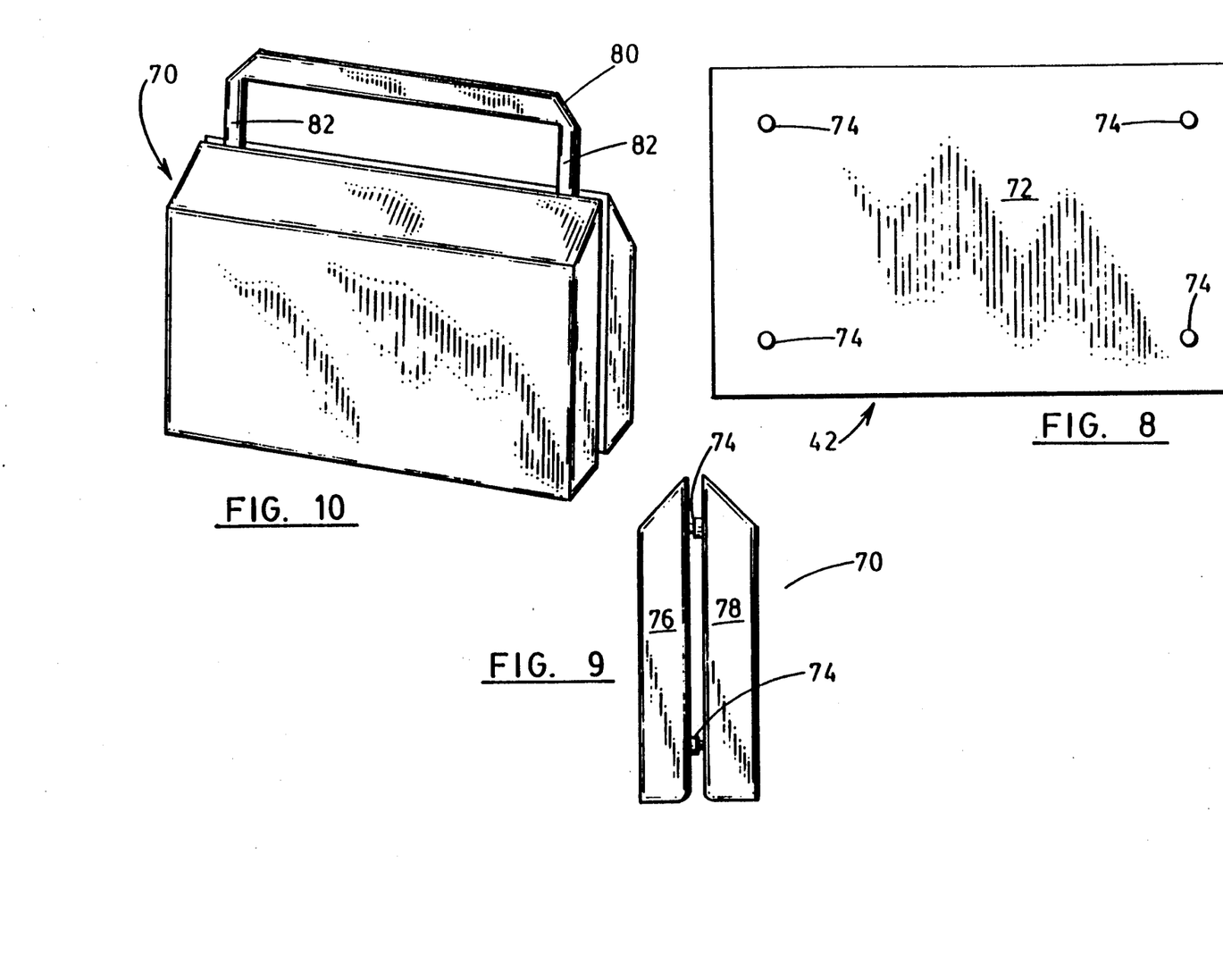
FIG. 8 is the under-surface of the bottom.
FIG. 9 is a side view of a double disk-storage device.
FIG. 10 is a perspective view of the double disk-storage device with a handle.

FIG. 8 is the under-surface 72 of the bottom 42. FIGS. 9 and 10 are a double disk-storage device 70.

Clasps 74 of FIG. 8 are attached to the under-surface 72 of the bottom 42 of a first device 76. These clasps 74 can be either male or female but must correspond to fit those on the bottom 42 of a second device 78 to which the first device 76 will be attached. Preferably, these clasps 74 allow separation of the first device 76 from the second device 78 for independent use. Of course, any other method of attaching these devices is contemplated. For example, the double disk-storage device could be made of a central portion having outwardly opposed faces. That is, a common, integral bottom could be utilized for both sides of the double disk-storage device.

Additionally, the handle 80 can be attached, either in conjunction with the clasps 74 or alone, for more convenient carrying. Preferably, the handle 80 has openings (not shown) at the lower end of its side bars 82 to slip over clasps 74 so that when first device 76 and second device 78 are attached, the handle 80 is held in place. Conversely, when first device 76 and second device 78 are separated, the handle 80 can be removed. Again, however, when the disk-storage device has a central portion, the handle could simply be permanently attached to the central portion.

The preferred embodiment as disclosed here provides a compact and efficient device for storing, organizing and transporting numerous music CDs. The preferred embodiment with only minor modifications can be adapted to accommodate disks of all sorts, shapes and sizes. The scope of the present invention therefore, is indicated by the following claims rather than the foregoing detailed description and all changes coming within the meaning and range of equivalency of the claims are intended to be embraced therein.

What is claimed is:

1. A storage device for storing both a compact disk and its accompanying identification label comprising
   (a) a base;
   (b) a lid; and
   (c) at least one disk holder page;
   the base having at least one circular holding pad and a foot,
   the holding pad being centrally located on the base and comprising a recessed portion for receiving the compact disk and a hub for retaining the compact disk,
   the foot having two upwardly extending side walls and an upwardly extending back wall, the side walls each having at least two pivot points aligned diagonally upwardly outward such that the topmost pivot point is nearest the back wall,
   the lid having openings on diagonally opposed corners to receive an identification label and being pivotally attached to the foot at the topmost pivot points such that when the lid is in an opened position the lid is supported by the foot back wall,
   the disk holder page having a topside and an underside, the topside having a holding pad centrally located and comprising a recessed portion for receiving the compact disk and a hub for retaining the compact disk, the disk holder page having openings on diagonally opposed corners to receive in its underside an identification label and being pivotally attached to the foot at any pivot points other than the topmost pivot points.

2. The storage device of claim 1 wherein the lid has a downwardly protruding peg,
   the topside of the page has a slit to receive the peg of the lid when the lid is in a closed position,
   the underside of the page has a downwardly protruding peg, and
   the base has an aperture to receive the bottom side peg when the individual disk holder page is in a closed position,
   whereby the storage device can be pivotally opened to expose the base while maintaining the lid and the disk holder page in contact.

3. The storage device of claim 1 wherein the side walls comprise a retaining slot and the lid comprises a pin, whereby the pin and retaining slot interact to prevent the lid from swinging to an opened position wider than the retaining slot will allow.

4. A storage device for storing a data disk comprising
   (a) a base;
   (b) a lid; and
   (c) a disk holder page;
   the base having a circular holding pad and a foot,
   the holding pad being centrally located on the base and comprising a recessed portion for receiving the compact disk and a hub for retaining the compact disk,
   the foot having two upwardly extending side walls and an upwardly extending back wall, the side walls each having two pivot points aligned diagonally upwardly outward such that the topmost pivot point is nearest the back wall, at least one side wall further having a retaining slot,
   the lid being pivotally attached to the foot at the topmost pivot points, and having a pin for engaging the retaining slot of the side wall whereby the pin and retaining slot interact to prevent the lid from swinging to an opened position wider than the retaining slot will allow,
   the disk holder page having a topside, the topside having a holding pad centrally located and comprising a recessed portion for receiving the compact disk and a hub for retaining the compact disk, and being pivotally attached to the foot at the pivot points other than the topmost pivot points.

5. A storage device for storing both a compact disk and its accompanying identification label, said device comprising
   (a) a bottom;
   (b) a top; and
   (c) at least one disk holder page;
   the bottom having a foot,
   the foot having two upwardly extending side walls and an upwardly extending back wall,
   the side walls each having at least two pivot points aligned diagonally upwardly outward such that the topmost pivot point is nearest the back wall, and an additional pivot point,
   the top being pivotally attached to the foot at the additional pair of pivot points,
   the disk holder page having a topside and an underside, the topside having a holding pad centrally located and comprising a recessed portion for receiving the compact disk and a hub for retaining the compact disk, the disk holder page having openings on diagonally opposed corners to receive in its underside an identification label and being pivotally attached to the foot at any pair of aligned pivot points.

6. The storage device of claim 5 wherein at least one side wall comprises a retaining slot and the top comprises a pin, whereby the pin and retaining slot interact to prevent the top from swinging to an opened position wider than the retaining slot will allow.

7. The storage device of claim 5 wherein the bottom has an under-surface, the under-surface having means for attaching the device to a second device.

8. A double disk-storage device comprising a first device and a second device, each storage device comprising
(a) a bottom;
(b) a top; and
(c) at least one disk holder page;
the bottom having a foot and an under-surface,
the under-surface having means for attaching the device to a second device,
the foot having two upwardly extending side walls and an upwardly extending back wall,
the side walls each having at least two pivot points aligned diagonally upwardly outward such that the topmost pivot point is nearest the back wall, and an additional pivot point,
the top pivotally attached to the foot at the additional pivot points,
the disk holder page having a topside and an underside, the topside having a holding pad centrally located and comprising a recessed portion for receiving the compact disk and a hub for retaining the compact disk, the disk holder page having openings on diagonally opposed corners to receive in its underside an identification label and being pivotally attached to the foot at any pair of the aligned pivot points,
the first device being attached to the second device at the attachment means of their respective under-surfaces.

9. The double disk-storage device of claim 8 and further comprising a handle, the handle being connected to the device at the attachment means of the first and second devices.

10. A double disk-storage device comprising
(a) a central portion having outwardly opposed faces;
(b) a pair of outside portions, each cooperating with one of said opposed faces to define first and second enclosures;
at least one disk holder page disposed in each said enclosure;
each outwardly opposed face having a foot,
the foot having two extending side walls and an extending back wall,
the side walls each having at least two pivot points aligned diagonally outward such that the outermost pivot point is nearest the back wall, and an additional pivot point,
one outside portion pivotally attached to each foot at the additional pivot points,
the disk holder page having a topside and an underside, the topside having a holding pad centrally located and comprising a recessed portion for receiving the compact disk and a hub for retaining the compact disk, the disk holder page having openings on diagonally opposed corners to receive in its underside an identification label and being pivotally attached to the foot at any pair of the aligned pivot points.

11. The double-disk storage device of claim 10 and further comprising a handle attached to said central portion.

* * * * *